US008939355B2

(12) United States Patent
Grossman

(10) Patent No.: US 8,939,355 B2
(45) Date of Patent: Jan. 27, 2015

(54) PROVIDING INFORMATION FROM USE OF READABLE INDICIA WITH MOBILE DEVICE

(71) Applicant: Bank of America Corporation, Charlotte, NC (US)

(72) Inventor: Glenn Grossman, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 16 days.

(21) Appl. No.: 13/732,378

(22) Filed: Jan. 1, 2013

(65) Prior Publication Data
US 2014/0183255 A1    Jul. 3, 2014

(51) Int. Cl.
*G06F 17/00*    (2006.01)
*G06Q 30/06*    (2012.01)

(52) U.S. Cl.
CPC ..................... *G06Q 30/06* (2013.01)
USPC ......................................................... 235/375

(58) Field of Classification Search
CPC .......... G07F 7/08; G06Q 20/40; G06Q 20/10; G06Q 40/00; G06Q 20/102; G06Q 40/02; G06K 17/00
USPC ........................................... 235/375; 705/16
See application file for complete search history.

(56) References Cited

U.S. PATENT DOCUMENTS

| | | | |
|---|---|---|---|
| 6,341,353 B1 | 1/2002 | Herman et al. | |
| 6,487,540 B1 | 11/2002 | Smith et al. | |
| 7,103,576 B2 | 9/2006 | Mann, III et al. | |
| 7,487,912 B2 | 2/2009 | Seifert et al. | |
| 2003/0055733 A1 | 3/2003 | Marshall et al. | |
| 2007/0156517 A1* | 7/2007 | Kaplan et al. | 705/14 |
| 2011/0113084 A1* | 5/2011 | Ramnani | 709/201 |
| 2012/0160911 A1 | 6/2012 | Smith et al. | |
| 2012/0166298 A1 | 6/2012 | Smith et al. | |
| 2012/0191597 A1 | 7/2012 | Capel et al. | |
| 2012/0253958 A1 | 10/2012 | Sock et al. | |
| 2012/0284130 A1* | 11/2012 | Lewis et al. | 705/16 |

OTHER PUBLICATIONS

Doc Lap Nguyen, "Digital Receipt System Using Mobile Device Technologies", University of New Orleans ScholarWorks@UNO, University of New Orleans Theses and Dissertations, p. 1-59, May 16, 2008.

(Continued)

*Primary Examiner* — Thien M Le
*Assistant Examiner* — Asifa Habib
(74) *Attorney, Agent, or Firm* — Michael A. Springs; Moore and Van Allen, PLLC; Patrick B. Horne

(57) ABSTRACT

Embodiments of the invention are directed to systems, methods and computer program products for providing information from use of readable indicia. Embodiments may include receiving usage information corresponding to a plurality of readable indicia read at one or more points of transaction during one or more transactions; storing some or all the usage information; and providing access to the stored usage information. Embodiments may receive one or more e-receipts from the one or more points of transaction; store the one or more e-receipts in the memory; and associate each e-receipt with usage information corresponding to the same transaction. Some embodiments receive a request from an online banking application or a mobile banking application of a user for usage information; and initiate presentation of some or all the usage information in response to the request.

21 Claims, 11 Drawing Sheets

(56) References Cited

OTHER PUBLICATIONS

Stephanie Clifford, "Digital Receipts at Stores Gain in Popularity", The New York Times, Aug. 8, 2011, http://www.nytimes.com/2011/08/08/technology/digital-receipts-at-stores-gain-in-popularity.html?_r=0.

* cited by examiner

PROVIDING INFORMATION FROM USE OF READABLE INDICIA WITH MOBILE DEVICE

BACKGROUND

Sometimes, a person wishes to transfer information about themselves to another person or entity, and often the person wishes to maintain secrecy from parties outside a transaction and security of the person's information.

BRIEF SUMMARY

Embodiments of the invention are directed to systems, methods and computer program products for providing information from use of readable indicia. The system includes a memory device storing computer executable code; and a processing device to execute the computer executable code to cause the processing device to receive usage information corresponding to a plurality of readable indicia read at one or more points of transaction during one or more transactions; store some or all the usage information; and provide access to the stored usage information.

In some embodiments, the computer executable code further causes the processing device to receive one or more e-receipts from the one or more points of transaction. In some such embodiments, the computer executable code further causes the processing device to store the one or more e-receipts in the memory; and associate each e-receipt with usage information corresponding to the same transaction.

In some embodiments, providing access to the stored usage information comprises receiving a request from an online banking application or a mobile banking application of a user for usage information; and initiating presentation of some or all the usage information in response to the request. In some such embodiments, the computer executable code further causes the processing device to initiate communication of a message indicating to the user an opportunity to share additional user information to a specific merchant. In other such embodiments, the computer executable code further causes the processing device to initiate communication of a message indicating to the user information about a specific merchant or an offer from the specific merchant.

In some embodiments, a merchant has a pre-established relationship with an administrator of the system; and where providing access to the stored usage information comprises receiving a request from a merchant application for usage information corresponding to the merchant; and initiating presentation of some or all the usage information in response to the request.

According to embodiments of the invention, a computer program product configured for providing information from use of readable indicia, the computer program product comprising a non-transitory computer readable medium comprising computer-executable instructions stored therein, the computer-executable instructions to cause a processing device to receive usage information corresponding to a plurality of readable indicia read at one or more points of transaction during one or more transactions; store some or all the usage information; and provide access to the stored usage information.

In some embodiments, the computer-executable instructions further cause the processing device to receive one or more e-receipts from the one or more points of transaction. In some such embodiments, the computer-executable instructions further cause the processing device to store the one or more e-receipts in the memory; and associate each e-receipt with usage information corresponding to the same transaction.

In some embodiments, providing access to the stored usage information comprises receiving a request from an online banking application or a mobile banking application of a user for usage information; and initiating presentation of some or all the usage information in response to the request. In some such embodiments, the computer-executable instructions further cause the processing device to initiate communication of a message indicating to the user an opportunity to share additional user information to a specific merchant. In other such embodiments, the computer-executable instructions further cause the processing device to initiate communication of a message indicating to the user information about a specific merchant or an offer from the specific merchant.

In some embodiments, a merchant has a pre-established relationship with an administrator of the system; and providing access to the stored usage information comprises receiving a request from a merchant application for usage information corresponding to the merchant; and initiating presentation of some or all the usage information in response to the request.

According to embodiments of the invention, a computer-implemented method for providing information from use of readable indicia includes using a computer processor operating computer program code instructions stored in a non-transitory computer readable medium, wherein the computer program code instructions cause the computer processor to receive usage information corresponding to a plurality of readable indicia read at one or more points of transaction during one or more transactions; store some or all the usage information; and provide access to the stored usage information.

In some embodiments, the computer program code instructions further cause the computer processor to receive one or more e-receipts from the one or more points of transaction. In some such embodiments, the computer program code instructions further cause the computer processor to store the one or more e-receipts in the memory; and associate each e-receipt with usage information corresponding to the same transaction.

In some embodiments, the computer program code instructions further cause the computer processor to receive a request from an online banking application or a mobile banking application of a user for usage information; and initiate presentation of some or all the usage information in response to the request. In some such embodiments, the computer program code instructions further cause the computer processor to initiate communication of a message indicating to the user an opportunity to share additional user information to a specific merchant. In some of these embodiments, the computer program code instructions further cause the computer processor to initiate communication of a message indicating to the user information about a specific merchant or an offer from the specific merchant.

In some embodiments, a merchant has a pre-established relationship with an administrator of the system; and where providing access to the stored usage information comprises receiving a request from a merchant application for usage information corresponding to the merchant; and initiating presentation of some or all the usage information in response to the request.

BRIEF DESCRIPTION OF THE DRAWINGS

Figure 1:
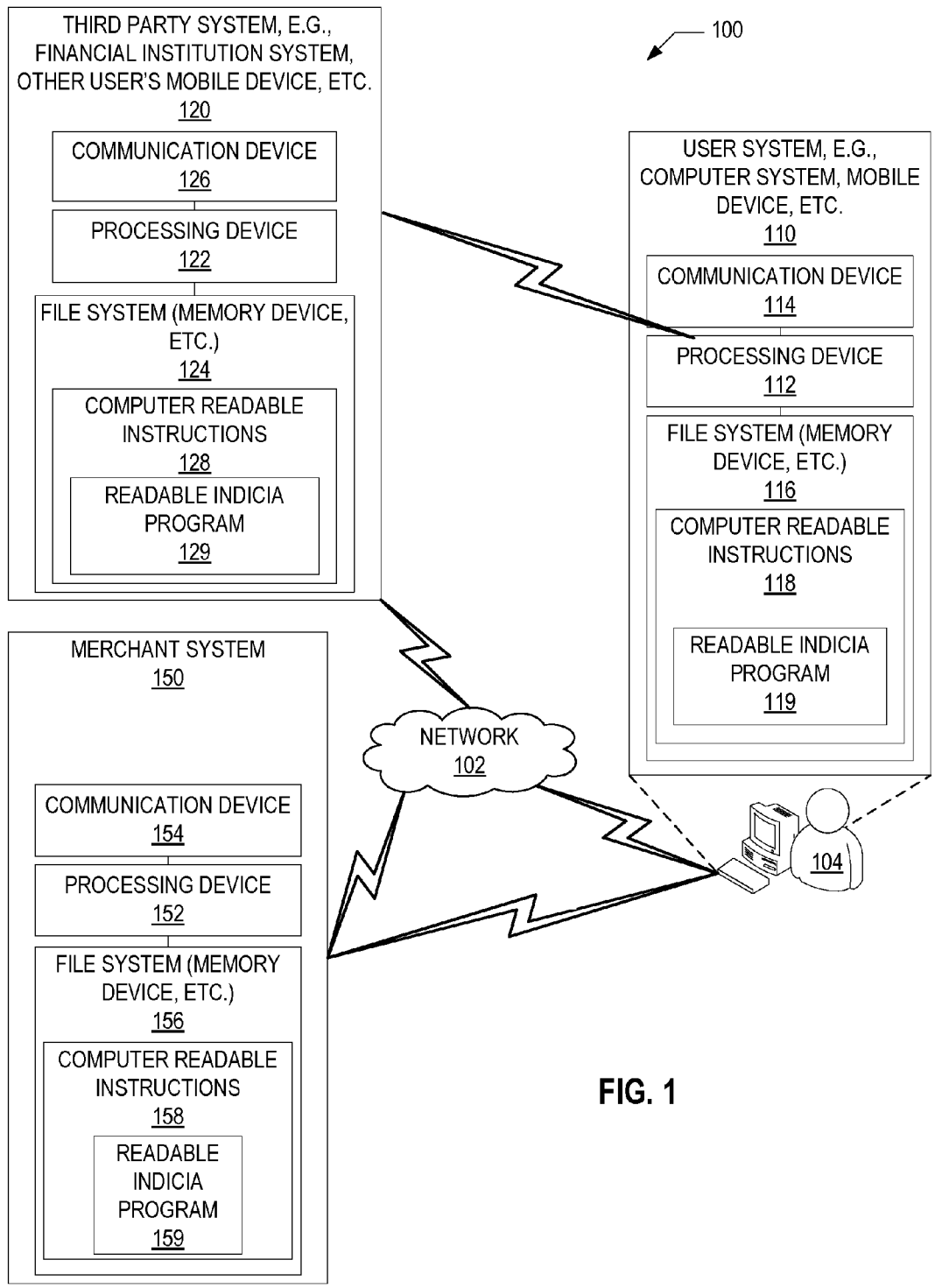
Figure 2:
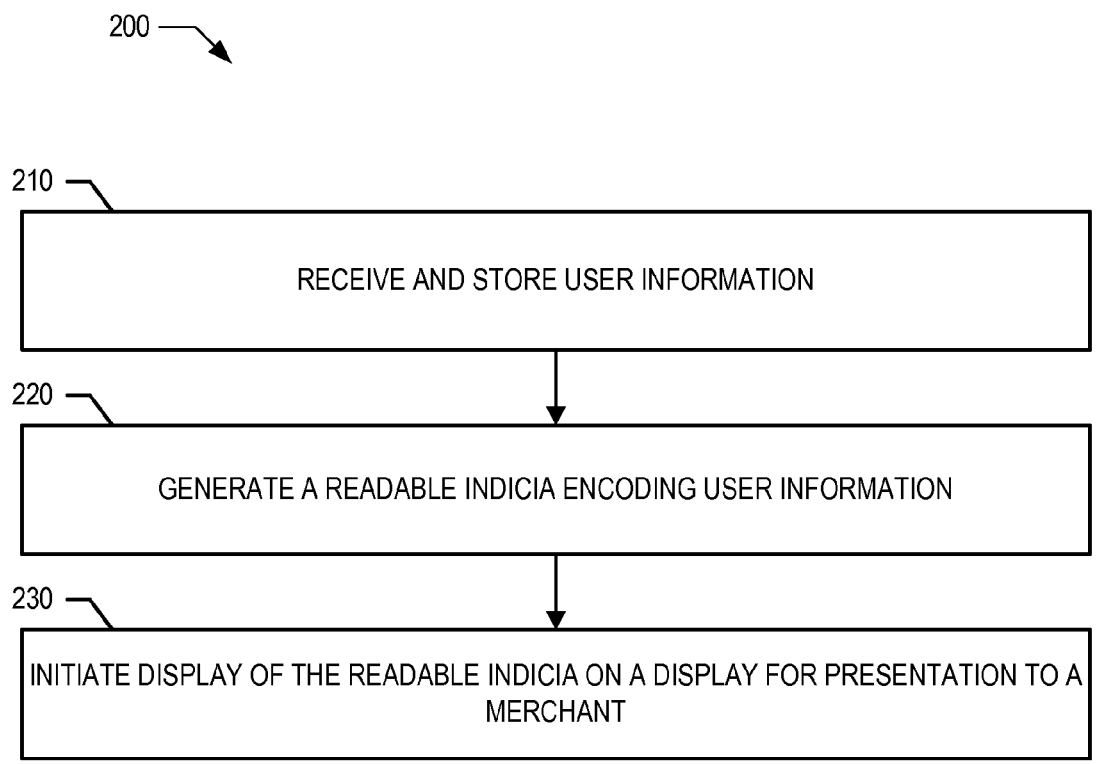
Figure 3:
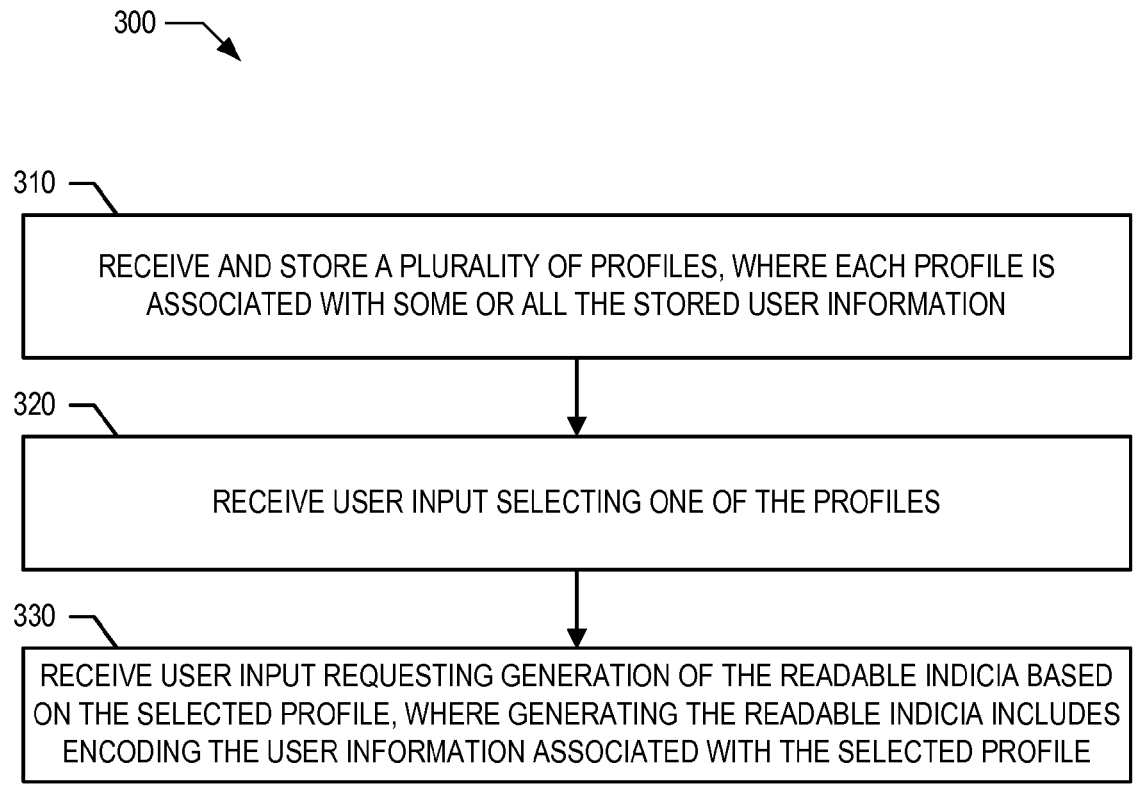
Figure 4:
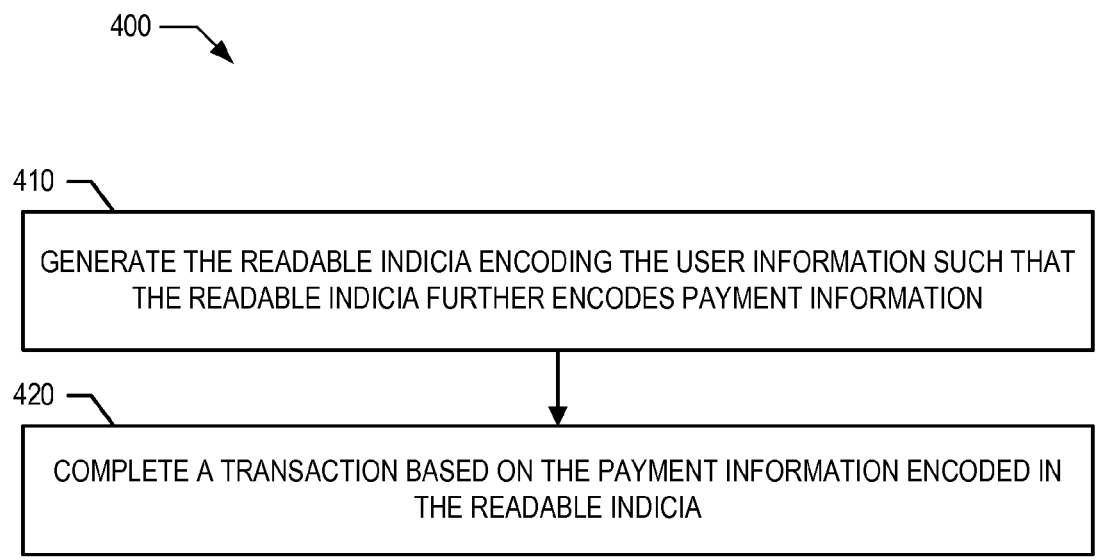
Figure 5:
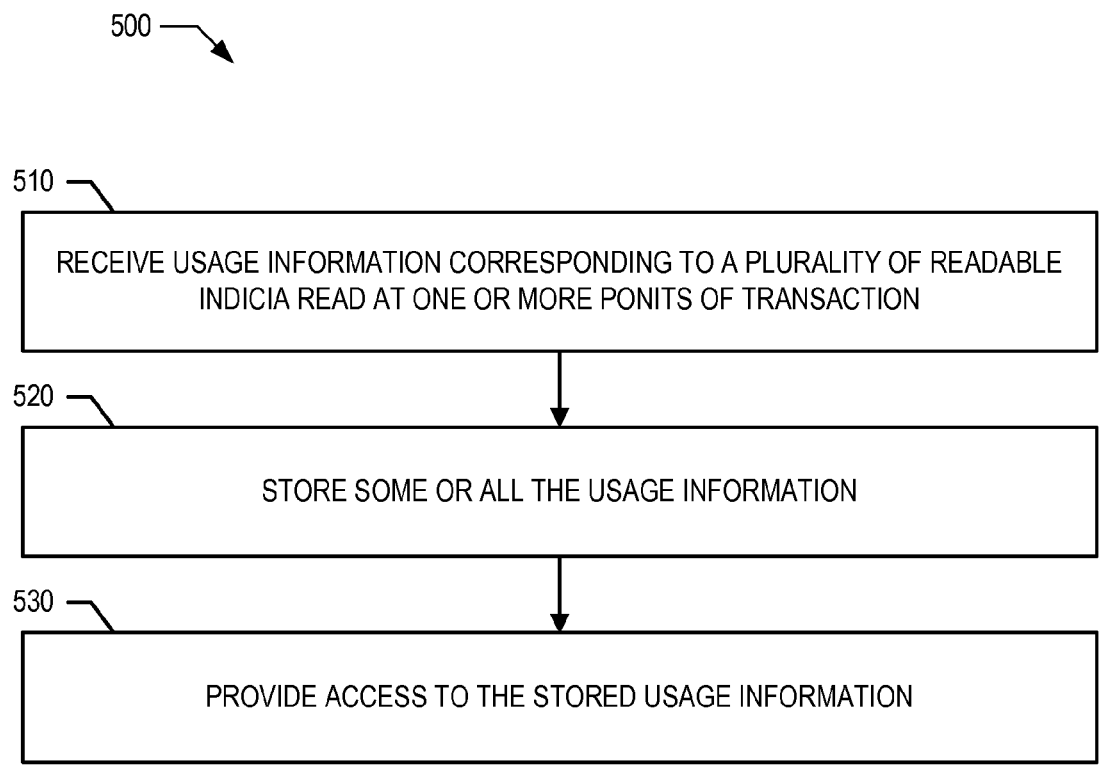
Figure 6:
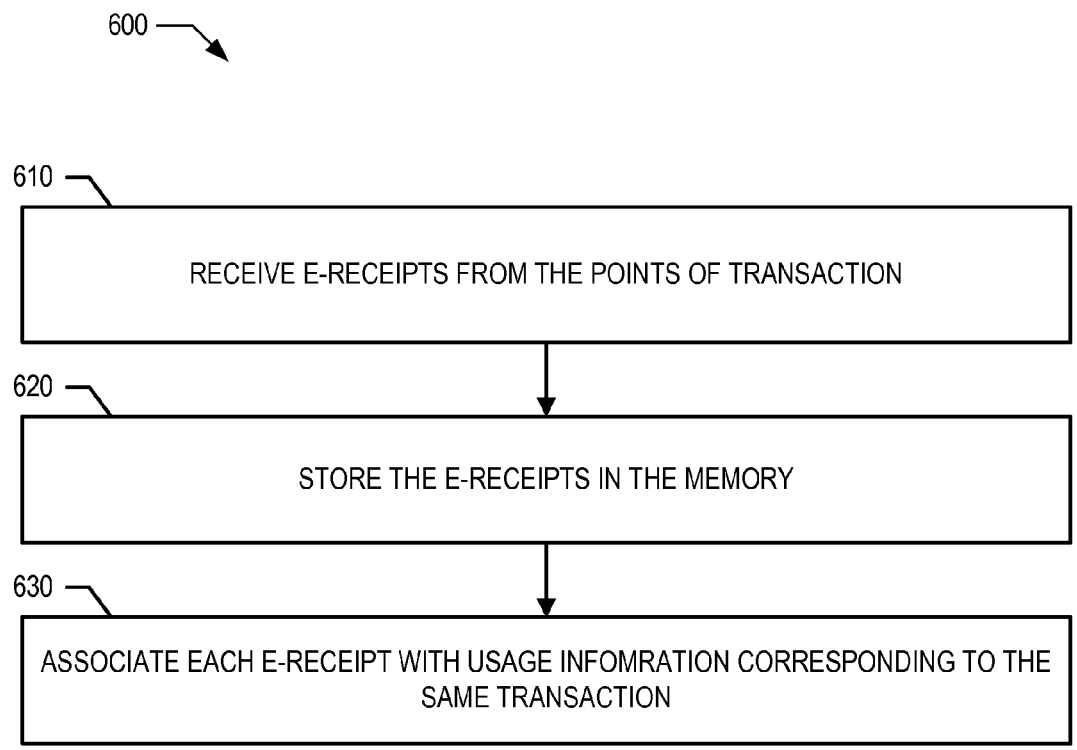
Figure 7:
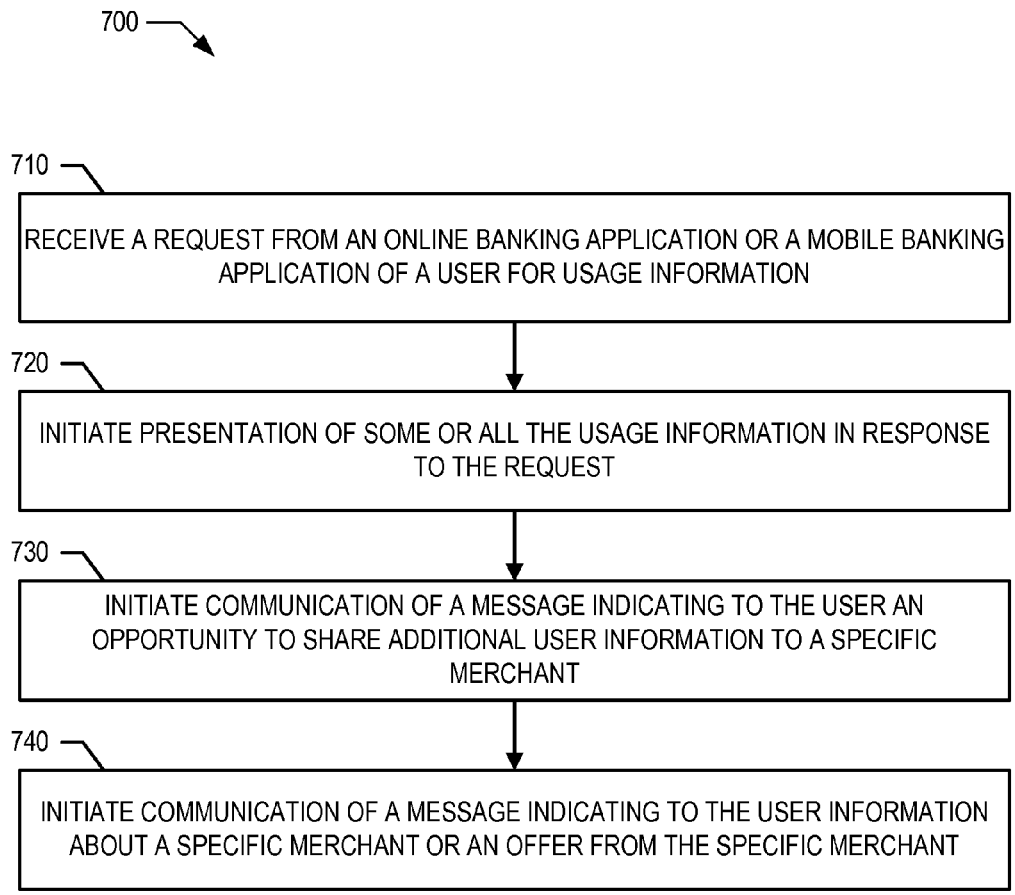
Figure 8:
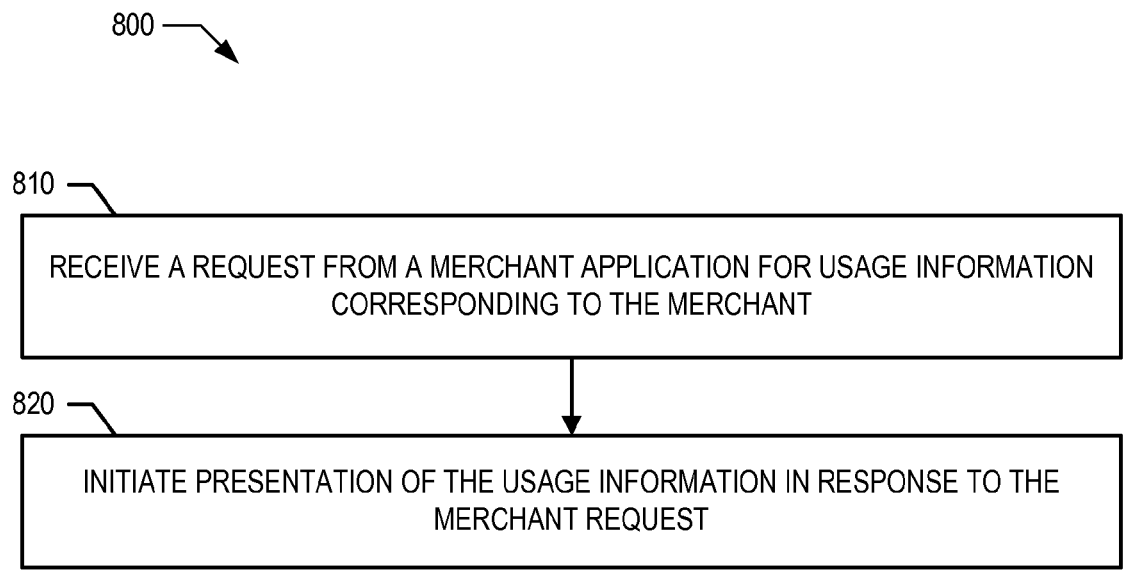
Figure 9:
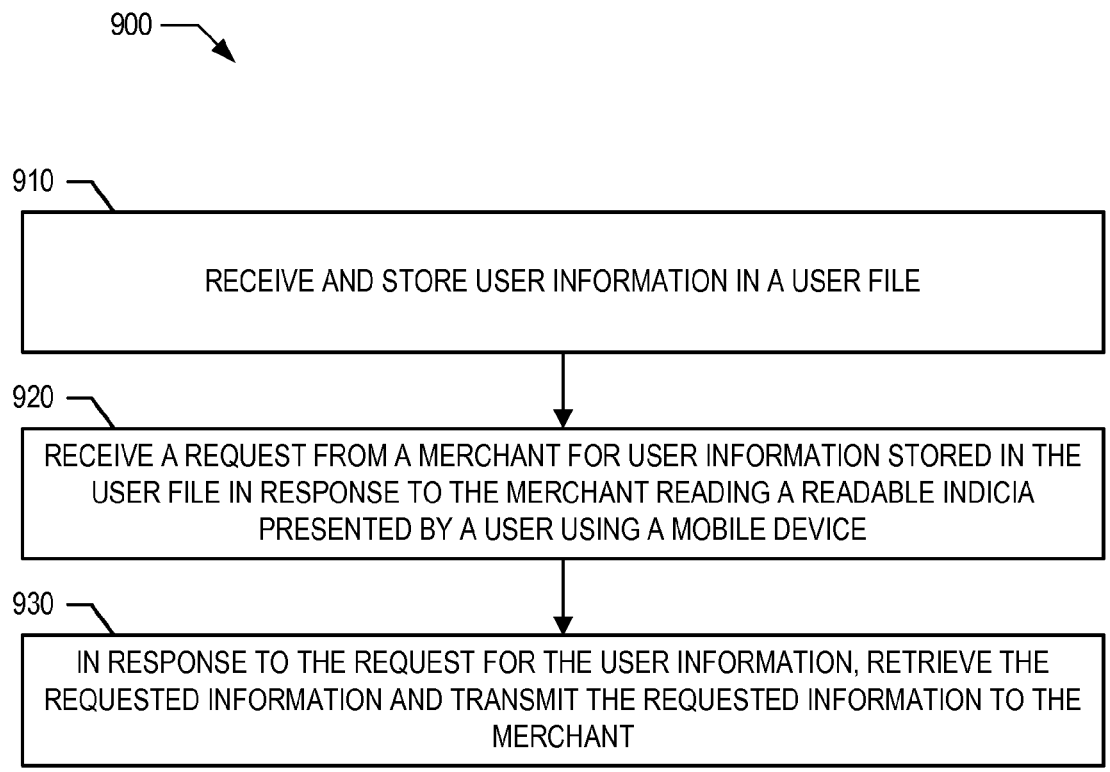
Figure 10:
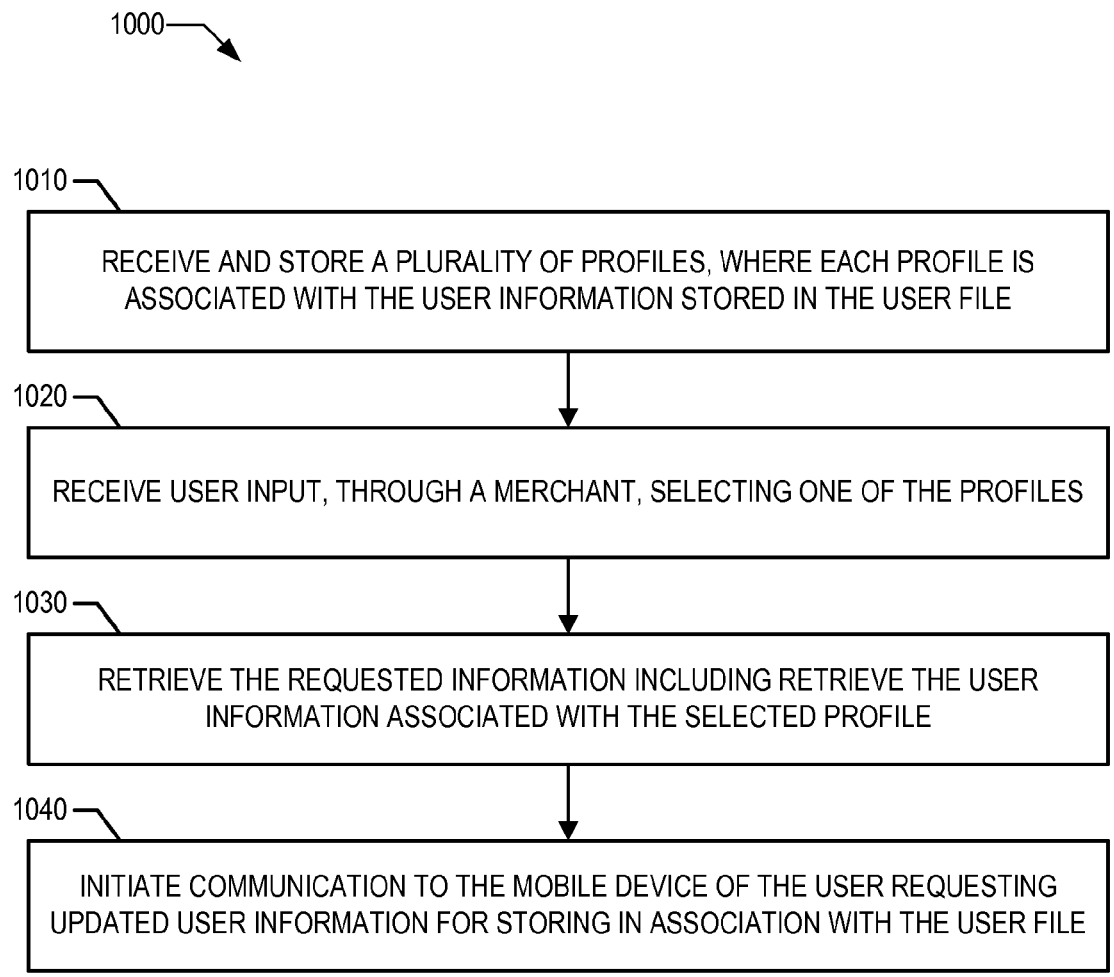
Figure 11:
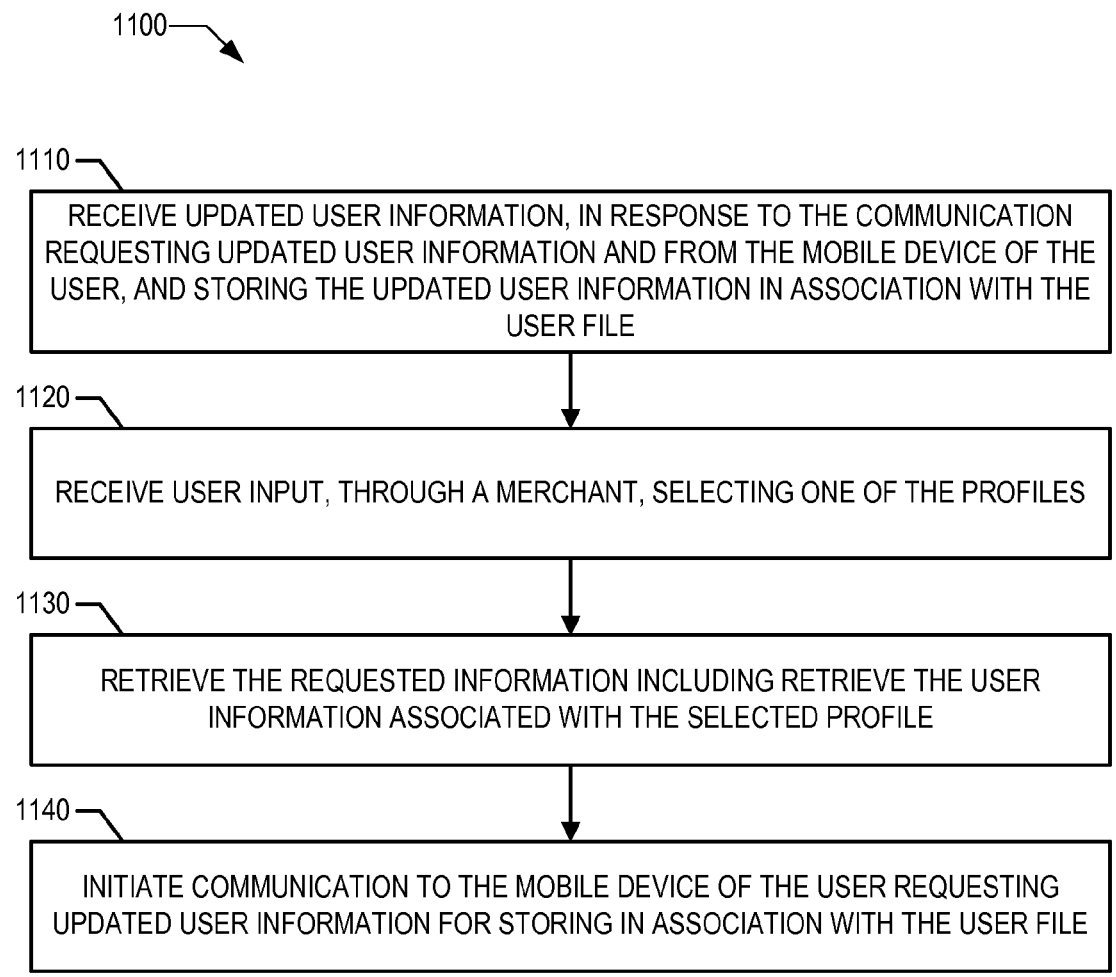

Having thus described embodiments of the invention in general terms, reference will now be made to the accompanying drawings, where:

FIG. 1 illustrates a block diagram of environment 100, in which systems operate according to embodiments of the invention;

FIG. 2 is a flowchart illustrating a method 200 for providing user information to a merchant during a transaction according to embodiments of the invention;

FIG. 3 is a flowchart illustrating another method 300 for providing user information to a merchant during a transaction according to embodiments of the invention;

FIG. 4 is a flowchart illustrating another method 400 for providing user information to a merchant during a transaction according to embodiments of the invention;

FIG. 5 is a flowchart illustrating a method 500 for providing information from use of readable indicia according to embodiments of the invention;

FIG. 6 is a flowchart illustrating another method 600 for providing information from use of readable indicia according to embodiments of the invention;

FIG. 7 is a flowchart illustrating another method 700 for providing information from use of readable indicia according to embodiments of the invention;

FIG. 8 is a flowchart illustrating a method 800 for providing user information to a merchant according to embodiments of the invention;

FIG. 9 is a flowchart illustrating another method 900 for providing user information to a merchant according to embodiments of the invention;

FIG. 10 is a flowchart illustrating another method 1000 for providing user information to a merchant according to embodiments of the invention; and FIG. 11 is a flowchart illustrating another method 1100 for providing user information to a merchant according to embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for providing user information to a merchant during a transaction, for providing information from use of readable indicia, and/or for providing user information to a merchant. As used herein, a "readable indicia" may be or include a code (e.g., a 2D code such as a barcode, a 3D code such as a Quick Response (QR) code, etc.).

Referring now to FIG. 1, a block diagram of environment 100, in which systems operate according to embodiments of the present invention is shown. FIG. 1 illustrates an environment 100 in which the third party system 120, the user system 110 and the merchant system 150 interact over a network 102. Each of the systems 120 and 150 communicate over the network 102 with the user system 110. In some embodiments, one or more of the systems 110, 120, and/or 150 communicate directly with one another.

In the various embodiments, the user system 110 is a computer system, mobile device or other computing device used by a client 104 or other user to interact with an organization's point of sale terminal, online content and the like, such as by communicating with the third party system 120 and/or the merchant system 150. The user system 110 includes, in the embodiment shown, a processing device 112 communicatively coupled with a communication device 114 and a file system 116. The processing device, in some embodiments, is configured for controlling operation of the communication device 114 in order to communicate across the network 102, such as, for example, with the financial institution system 120 and/or the merchant system 150. The file system 116 is or includes a memory device or other memory configured for storing computer readable instructions 118 such as an operating system, applications, such as a browser and others, other computer program code and the like. In some embodiments, the computer readable instructions include a readable indicia program 119 or application configured for instructing the processing device 112 to generate a readable indicia encoding user information and/or perform one or more of the methods and/or steps discussed herein and/or perform one or more transactions such as with a point of transaction or point of sale of a merchant. The readable indicia program 119, in some embodiments, is configured for instructing the processing device 112 to communicate with the third party system, 120 and/or the merchant system 150 either directly or over one or more external networks such that the user device may present readable indicia to other systems, communicate messages from the user of the user system and/or potentially complete a transaction, among other things. The processing device 112, of course, is configured for accessing and/or retrieving some or all the computer readable instructions 118 and executing some or all of them.

In one embodiment, for example, the network 102 is an intranet or other local area network (LAN) and the user system 110, the third party system 120, and the merchant system 150 are all part configured for communicating with one another across the intranet. In such an embodiment, the user system 110, when directed by the user 104 to access a particular intranet webpage, uses a browser program to navigate to the intranet webpage. The browser then requests online interaction, such as webpage content, from the third party system 120.

The third party system 120, in some embodiments, is a server such as an organization server. The organization may be a financial institution in some embodiments. In other embodiments, the third party system 120 represents another user's mobile device or other system. In some such cases, the third party system 120 is considered part of one or more backend systems of a bank. The third party system 120 includes, in some embodiments, a processing device 122 communicatively coupled with a communication device 126 and a file system 124, such as a memory device or memory. The processing device 122 is configured for controlling operation of the communication device 126 for communicating over the network 102 such as with the user system 110 and/or the merchant system 150. The file system 124 is configured for storing computer readable instructions 128, such as, for example, the readable indicia program 129, an operating system, other applications, other computer executable program code and the like. The readable indicia program 129 includes program code and/or instructions for performing one or more of the methods and/or method steps discussed herein. For example, in one embodiment, the readable indicia program 129 is configured for instructing the processing device 122 to read a readable indicia generated by the user device 110 and decode the readable indicia in order to ascertain information about the user 104 of the user device 110. The processing device 122, of course, is configured to access and/or retrieve some or all the computer readable instructions 128 and execute some or all of them.

The merchant system 150 is, in some embodiments, a server such as an organization server, a computer system, another computing device or the like. In some embodiments it includes or is a point of sale device or point of transaction device. The merchant system 150, in some embodiments, includes a processing device 152 communicatively coupled with a communication device 154 and a file system 156. The processing device 152 is typically configured to control the communication device for communicating across the network 102 with one or more of the other systems, such as the financial institution system 120 and/or the user system 110. The file system 156 is configured for storing computer readable instructions such as a readable indicia program 159, an operating system, other computer executable program code, applications and the like. The processing device 152 is configured for accessing and/or retrieving some or all the computer readable instructions 158 from the file system 156 and executing some or all of them. In some embodiments, for example, the readable indicia program 159 includes program code configured to instruct the processing device 152 to communicate with the user device 110 either directly or over one or more external networks in order to read a readable indicia generated by the user device 110, and, in some embodiments, to complete a transaction with the user of the user device 110 or otherwise interact.

Further, the embodiments described herein may refer to use of a transaction or transaction event. Unless specifically limited by the context, a "transaction" refers to any communication between the user and a merchant, financial institution, insurance company, or other entity. A "transaction" may also include a bill, statement, purchase at a POT, online purchase, purchase at a merchant, and/or the like. For example, in some embodiments, a transaction may include one or more of the following: purchasing, renting, leasing, bartering, selling, and/or leasing goods and/or services (e.g., groceries, stamps, tickets, DVDs, vending machine items, or the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like. For example, a transaction may occur when a user purchases a product at a merchant. In yet other embodiments, for example, a transaction may occur when an entity associated with the user is alerted. A transaction may occur when a user accesses a building, uses a rewards card, and/or performs an account balance query. A transaction may occur as a user's device establishes a wireless connection, such as a Wi-Fi connection, with a point-of-transaction terminal.

In still further embodiments, a transaction may refer to an event and/or action or group of actions facilitated or performed by a user's device, such as a user's mobile system, a merchant system, and/or a combination thereof. A device capable of facilitating or performing a transaction may be referred to herein as a "POT system" or "POT device." A "point-of-transaction" or "POT" could refer to any location, virtual location or otherwise proximate occurrence of a transaction. A POT system may refer to any device used to perform a transaction, either from the user's perspective, the merchant's perspective or both. In some embodiments, the POT system refers only to a user's system, in other embodiments it refers only to a merchant system, and in yet other embodiments, it refers to both a user device and a merchant device interacting to perform a transaction. For example, in one embodiment, the POT system refers to the user's mobile device configured to communicate with a merchant's system, whereas in other embodiments, the POT system refers to a merchant's system configured to communicate with a user's mobile device, and in yet other embodiments, the POT system refers to both the user's mobile device and the merchant's system configured to communicate with each other to carry out a transaction.

In some embodiments, a POT system is or includes an interactive computer terminal that is configured to initiate, perform, complete, and/or facilitate one or more transactions. A POT system could be or include any device that a user may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), a gaming device, and/or various combinations of the foregoing.

In some embodiments, a POT system is operated in a public place (e.g., on a street corner, at the doorstep of a private residence, in an open market, at a public rest stop, or the like). In other embodiments, the POT system, is additionally or alternatively operated in a place of business (e.g., in a retail store, post office, banking center, grocery store, factory floor, or the like). In accordance with some embodiments, the POT system is not owned by the user of the POT system. Rather, in some embodiments, the POT system is owned by a mobile business operator or a POT operator (e.g., merchant, vendor, salesperson, or the like). In yet other embodiments, the POT system is owned by the financial institution offering the POT system providing functionality in accordance with embodiments of the invention described herein.

In some embodiments, the readable indicia comprises visual indicia, e.g., a barcode, a Quick Response (QR) code, etc. The readable indicia may comprises any one-dimensional or two-dimensional code. In embodiments where the readable indicia is in electronic form, the readable indicia may be dynamically generated after the user selects an option to view the readable indicia (e.g., on the user's portable mobile communication device).

In some embodiments, the readable indicia, and optionally the payment, may be presented from a first user to a second user. The first user may present readable indicia on the first user's mobile device or may issue readable indicia to the second user on a physical medium (e.g., paper). The readable indicia may represent a payment of an amount of funds. The second user may receive information associated with the presented readable indicia using the second user's portable mobile communication device. Therefore, as used herein, a merchant may be or include an individual. The readable indicia may comprise any indicia, visual or non-visual, where information associated with the indicia is receivable or readable (e.g., scannable) by the mobile device. For example, the readable indicia is comprised in a tag (e.g., radio frequency identification (RFID) tag, near field communication (NFC) tag, etc.). A user may bring a mobile device in close proximity to the tag in order to receive information (e.g., readable indicia) associated with the tag. In some embodiments, the readable indicia may be processed by at least one of the mobile device or an external server to determine a link (e.g., a hyperlink) associated with the readable indicia. The user interface of the mobile device may present the link and may prompt the user to visit the link. The link may transport the user to a user interface page for entering authentication credentials, during a payment transaction. Prior to enabling the user to enter the authentication credentials, one or more mobile interface pages of advertisements may be presented to the user.

Referring now to FIG. 2, a flowchart illustrates a method 200 for providing user information to a merchant during a transaction. In some embodiments, the invention generates a readable indicia, such as a QR code, that stores information related to the user. This information may be provided to a merchant or other entity that reads or scans the readable indicia, and then decodes the readable indicia, thereby determining the user information encoded therein. In some instances, the user may wish to pass identification information and/or contact information to a third party, similar to an electronic business card. The user may establish preferences, by entering them into the user's device, which are stored either on the user's device or on a remote server, and those preferences may specify the amount of user information that is passed through the readable indicia. In some cases, the user establishes a default profile for communicating a particular set of user information and in some cases, the user establishes other user profiles for communicating distinct combinations of information. In some embodiments, a mobile wallet of the user's mobile device also uses the generated readable indicia for presenting payment information to a merchant.

For example, a user may be performing a transaction with a merchant at a point of transaction. The user may initiate the mobile wallet of the user's mobile device to generate a readable indicia such that the readable indicia includes user-selected user information such as preferred email address, name information, phone number and/or the like. The readable indicia may also include payment information such as credit/debit card information and/or bank account information. The user may then present the display of the mobile device to the merchant for reading of the readable indicia. The merchant scans the readable indicia, decodes it, and thereby knows the information included in it, such as the payment information and the user information such as email address and the like. In some cases, the readable indicia may have different or additional information encoded such as loyalty information or otherwise. Thus, the user's personal information is not exposed to other nearby customers or the associate of the merchant.

The first step of method 200, represented by block 210 is to receive and store user information, such as on a mobile device of a user. The mobile device may prompt the user to enter user information and the user may select which information to enter. The next step, represented by block 220 is to generate a readable indicia encoding user information, such as during a transaction between the user and a merchant. The user may specify which user information to be encoded in the readable indicia, and as discussed further below, the user may specify different profiles for generating different readable indicia as desired. The next step, represented by block 230 is to initiate display of the readable indicia on a display for presentation to a merchant. The display may be the display of the mobile device or another display, such as a peripheral display device connected, wired or wirelessly, with the mobile device of the user.

Referring now to FIG. 3, a flowchart illustrates another method 300 for providing user information to a merchant during a transaction. The first step, represented by block 310, is to receive and store a plurality of profiles. Each of the profiles, in some embodiments, is associated with some or all the stored user information. The user may input preferences for the plurality of profiles. For example, a user may want a high information profile that would generate a high information readable indicia and a low information profile that would generate a low information readable indicia for presentation to a third party. The high information profile may include all of the user information inputted by the user, whereas the low information profile may include only a small portion of the user information inputted by the user, such as name and email address. In some embodiments, default profiles are created automatically by the user's mobile device and/or mobile wallet. For example, the readable indicia program may intake all the user information and generates profiles based on the information inputted by the user without further input necessary. The readable indicia program may generate, for example, a high information profile with all the user's information, a medium information profile with some of the user's information and a low information profile with only a small amount of the user's information.

The next step, represented by block 320, is to receive user input selecting one of the profiles. The user may be involved in a transaction and wish to provide user information to a merchant or other transacting entity, such as another person. The user may then select one of the user-defined profiles, or in some embodiments, one of the automatically generated user profiles. Finally, represented by block 330, the next step is to receive user input requesting generation of the readable indicia based on the selected profile, where generating the readable indicia includes encoding the user information associated with the selected profile.

Referring now to FIG. 4, a flowchart illustrates another method 400 for providing user information to a merchant during a transaction. The first step, represented by block 410, is to generate the readable indicia encoding user information such that the readable indicia further encodes payment information in the case where the user wants to use the readable indicia for making a payment during a transaction. The next step, represented by block 420, is completing a transaction based on the payment information encoded in the readable indicia.

In various embodiments, the readable indicia include an additional security mechanism, such as a required authentication code. For example, in order for the merchant to access the user information encoded in the readable indicia, the user must input a PIN or other authentication code to the merchant's system, such as a point of transaction system. This authentication code may be encoded with the readable indicia so that once the authentication code is submitted, the information stored in the readable indicia is unlocked.

In some instances, a readable indicia includes more information than is intended to be communicated to the third party. For example, a high information readable indicia may be generated and have multiple authentication codes associated with it. One authentication code may unlock all the user information stored in the readable indicia, and another may unlock only a small amount of the user information stored in the readable indicia. A user may then, once a merchant has scanned a readable indicia, input the desired authentication code, for release of the desired level of user information to the third party.

In some embodiments, the readable indicia is generated as a one-time use code and requires entry of a secondary authentication code for access to the information included in the indicia. For example, once the readable indicia has been scanned and the information included there has been unlocked, the readable indicia may no longer be used for accessing the information. That is, another readable indicia must be generated for providing information to a third party.

Referring now to FIG. 5, a flowchart illustrates a method 500 for providing information from use of readable indicia. In various embodiments of the invention, a system of the invention, such as a financial institution system or otherwise, tracks some or all the uses of readable indicia by a user. For example, the third party system or financial institution system, may track when a user uses a readable indicia at a merchant such as for providing loyalty information and/or payment information to the merchant. The system then stores the tracking information and provides access to the information to the user and/or the financial institution or other party having authorization to access the information. In some cases, information may be provided to merchants having a relationship with the financial institution storing the tracking information. In some embodiments, a receipt or e-receipt may be stored based on user input and/or preferences, and information regarding the receipt may be available for consideration by those entities authorized for access. In some instances, a financial institution storing readable indicia tracking information may be used to perform future targeted marketing or other use cases, or a user may use the tracking information as an e-receipt storehouse. As another example, the user may pay a merchant using the readable indicia of the mobile wallet and the financial institution may determine the location of the mobile device and store receipts along with location information indicating the location where the transaction occurred.

The first step of method 500, represented by block 510, is to receive usage information corresponding to a plurality of readable indicia read at one or more points of transaction. When a user's readable indicia is read by a merchant, the merchant system may communicate information to a financial institution's system indicating that the readable indicia has been scanned. The financial institution system may store that the read occurred and may store other information associated with the read, as represented by block 520. The final step, represented by block 530, is to provide access to the stored usage information to an entity having authorization to access the information. For example, the user may desire to access the information to review which locations the user has provided user information and/or performed other transactions.

Referring now to FIG. 6, a flowchart illustrates another method 600 for providing information from use of readable indicia. The first step, represented by block 610, is to receive e-receipts from points of transaction. The next step, represented by block 620, is to store the e-receipts in the memory, and the final step, represented by block 630, is to associate each e-receipts with usage information corresponding to the same transaction. These receipts/e-receipts may be stored based on user input and/or preferences provided before the interaction or during the interaction/transaction.

Referring now to FIG. 7, a flowchart illustrates another method 700 for providing information from use of readable indicia. The first step, represented by block 710, is to receive a request from an online banking application or a mobile banking application of a user for usage information. These requests may originate from a user's mobile device or desktop computer or otherwise or may originate from a merchant or other party with authorization to access the usage information. The next step, represented by block 720, is to initiate presentation of some or all the usage information in response to the request. This may include accessing a collocated and/or remote database where the usage information is stored.

The next step, represented by block 730, is to initiate communication of a message indicating to the user an opportunity to share additional user information to a specific merchant. This message may be communicated to the user in response to the user presenting to a merchant or other third party some information about the user, for example, the user's email and name. The message may be communicated to the user in order to urge the user to communicate additional information to the third party, such as the user's phone number, address or otherwise. The communication may include an offer for the third party, such as a merchant to enter the user into a loyalty program, provide an offer to the user, or otherwise. In some embodiments, the final step, represented by block 740, is to initiate communication of a message indicating to the user information about a specific merchant or an offer from the specific merchant. Thus, the merchant or other third party may wish to communicate information about the merchant to the user. For example, when the user provide user information to the merchant during a transaction, the merchant may then send the user a communication, such as a message to the email address provided by the user during the transaction, providing the user information about the merchant, the merchant's affiliates, offers from the merchant or the like.

In some embodiments, usage information or portions of the usage information may be provided to merchants or other third parties having a relationship with the financial institution storing the usage information. In some cases, users opt-in to allowing some or all the usage information to be provided to third parties. For example, a user may want their usage information to be provided to merchants that may provide the user offers in the future.

Referring now to FIG. 8, a flowchart illustrates a method 800 for providing user information to a merchant. In some embodiments, one or more systems of the invention serve as a clearinghouse or storehouse for identification information or other sensitive user information. A point of sale or point of transaction may release information, a merchant may send a receipt to the financial institution, and the financial institution may then take the information in, store it, and/or forward it to the user or other third party with authorization. The financial institution system may also provide a safe and secure storehouse for the user's identity information, where the information may be released only when requested by the user. In this regard, the sensitive information may be stored remotely to the mobile device for security purposes.

The first step of method 800, represented by block 810, is to receive a request from a merchant application for usage information corresponding to the merchant. The next step, represented by block 820, is to initiate presentation of the usage information in response to the merchant request.

Referring now to FIG. 9, a flowchart illustrates another method 900, for providing user information to a merchant. The first step, represented by block 910, is to receive and store user information in a user file. The next step, represented by block 920, is to receive a request from a merchant for user information stored in the user file in response to the merchant reading a readable indicia presented by a user using a mobile device. The final step, represented by block 930, is, in response to the request for the user information, to retrieve the requested information and transmit the requested information to the merchant.

Referring now to FIG. 10, a flowchart illustrates another method 1000 for providing user information to a merchant. The first step, represented by block 1010, is to receive and store a plurality of profiles, where each profile is associated with the user information stored in the user file. The next step, represented by block 1020, is to receive user input, through a merchant, selecting one of the profiles. The next step, represented by block 1030, is to retrieve the requested information including retrieving the user information associated with the selected profile. The last step, represented by block 1040, is to initiate communication to the mobile device of the user requesting updated user information for storing in association with the user file.

Referring now to FIG. 11, a flowchart illustrates another method 1100 for providing user information to a merchant. The first step, represented by block 1110, is to receive updated user information, in response to the communication requesting updated user information and from the mobile device of the user. Then the updated user information is stored in association with the user file.

The next step, represented by block 1120, is to receive user input, through a merchant, selecting one of the profiles. The next step, represented by block 1130, is to retrieve the requested information including retrieving the user information associated with the selected profile. The last step, represented by block 1140, is to initiate communication to the mobile device of the user requesting updated user information for storing in association with the user file.

In this regard, the financial institution system and/or other systems may serve as a storehouse for the user's identity information or other sensitive information. In some embodiments, the point of transaction system may release user information that was captured from a readable indicia of the user and the merchant may send a receipt to the financial institution confirming completion of the transaction. The financial institution may then take the information, store it, and/or forward it to the user or other party with authorization. The financial institution may provide a safe and secure storehouse for the user's identity, where the information may be released only when requested by the user or the user's authorized agent. Thus, sensitive user information may be stored remotely to the mobile device of the user for security.

For example, in some embodiments, the financial institution hosts the user's user information that may include marketing preferences, digital offers and the like. The financial institution may house the user's information such as identity information such that a readable indicia provided to a third party by the user includes a link to the financial institution system, which may then release the user's information immediately or upon secondary authentication. In some embodiments, the primary authentication is provided by the application running on the user's mobile device, such as the user's mobile wallet. Thus, the readable indicia generated and presented to the third party has already been authenticated.

Therefore, a user may access the financial institution system and update his or her user information at a single location. Then, when the user presents a readable indicia linking to the financial institution system, the user is assured that the information being provided to the third party is current and accurate. The information presented to a third party by embodiments of the inventions described herein provide a benefit in that the information may be presented in a uniform, standardized format instead of every retailer, merchant or third party having a unique format.

In some embodiments, when a point of transaction reads a readable indicia from a user, it determines a link that points to a financial institution server. The point of transaction may then provide any necessary authentication information to retrieve the desired user information maintained by the financial institution server. For example, the point of transaction may provide information presented in the readable indicia by the user, such as information identifying the mobile device of the user or the financial institution server may request additional authentication information from the point of transaction and/or the user. For example, the financial institution server may request that the point of transaction receive supplemental authentication information from the user before releasing any of the user's information stored by the financial institution server. For example, the financial institution server may request a PIN or other authentication before releasing the requested user information to the point of transaction. In some embodiments, when the user presents information to a third party, such as a merchant, information identifying the third party may be stored by the financial institution for later access by the user or other authorized parties.

In some embodiments, the financial institution server maintains a database of the user information that may be accessed by an alias of the user. For example, the user may have a username or email address that is used as an alias for access and release of some or all the user's information stored and maintained by the financial institution system. The alias may be encoded in a readable indicia presented to a third party along with a link to the financial institution system for accessing the user information. In this regard, the financial institution system serves as a secure storehouse for the user's information. As discussed elsewhere herein, the financial institution system may require supplemental authentication (such as a password, PIN or otherwise) before releasing any of the user information to the requesting entity.

In some embodiments, when the user is presenting information to a third party using a readable indicia, primary, secondary and/or additional authentication is required for certain profiles and less or no authentication is required for other profiles. For example, the user may indicate that for a low information profile, no authentication is required, for a medium information profile primary authentication (such as from the mobile wallet of the mobile device of the user) is required, and for a high information profile both primary and secondary authentication are required (such as from the mobile wallet plus an additional authentication such as a PIN built into the readable indicia or otherwise).

In various embodiments, one or more of the method steps discussed above may be combined with one or more of the method steps discussed with reference to the same and/or different figures. In various embodiments one or more of the method steps discussed above are not required and are omitted from the method. In various embodiments, one or more of the method steps discussed above may be combined with one or more of the other method steps discussed above and/or one or more additional steps not discussed herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for providing information from use of readable indicia, the system comprising:
   a memory device storing computer executable code;
   a processing device to execute the computer executable code to cause the processing device to:
   receive usage information corresponding to a plurality of readable indicia read at one or more points of transaction during one or more transactions, wherein:
   reading the readable indicia further comprises:
   determining whether a user profile associated with the readable indicia is at least one of a low information profile, a medium information profile, or a high information profile;
   receiving one or more authentication credentials from the user based on at least the determined user profile, wherein a high information profile requires a primary authentication and a secondary authentication, wherein a medium information profile requires a primary authentication, and a low information profile does not require any authentication credential; and
validating the one or more received authentication credentials;
the usage information comprises user information associated with one or more of the transactions and transaction information comprising amount of the one or more transactions; and
the user information has been selected by one or more customers performing the one or more transactions and comprises user identification information comprising name information and contact information comprising a preferred email address or phone number;
receive location information associated with a location of the one or more points of transaction;
associate location information with transaction information associated with the same transaction, resulting in an transaction location profile;
store some or all the usage information including at least one transaction location profile; and
provide access to the stored usage information including the at least one transaction location profile.

2. The system of claim 1, wherein the computer executable code further causes the processing device to:
receive one or more e-receipts from the one or more points of transaction.

3. The system of claim 2, wherein the computer executable code further causes the processing device to:
store the one or more e-receipts in the memory; and
associate each e-receipt with usage information corresponding to the same transaction.

4. The system of claim 1, wherein providing access to the stored usage information comprises:
receiving a request from an online banking application or a mobile banking application of a user for usage information; and
initiating presentation of some or all the usage information in response to the request.

5. The system of claim 4, wherein the computer executable code further causes the processing device to:
initiate communication of a message indicating to the user an opportunity to share additional user information to a specific merchant.

6. The system of claim 4, wherein the computer executable code further causes the processing device to:
initiate communication of a message indicating to the user information about a specific merchant or an offer from the specific merchant.

7. The system of claim 1, wherein a merchant has a pre-established relationship with an administrator of the system; and
wherein providing access to the stored usage information comprises:
receiving a request from a merchant application for usage information corresponding to the merchant; and
initiating presentation of some or all the usage information in response to the request.

8. A computer program product configured for providing information from use of readable indicia, the computer program product comprising a non-transitory computer readable medium comprising computer-executable instructions stored therein, the computer-executable instructions to cause a processing device to:
receive usage information corresponding to a plurality of readable indicia read at one or more points of transaction during one or more transactions, wherein:
reading the readable indicia further comprises:
determining whether a user profile associated with the readable indicia is at least one of a low information profile, a medium information profile, or a high information profile;
receiving one or more authentication credentials from the user based on at least the determined user profile, wherein a high information profile requires a primary authentication and a secondary authentication, wherein a medium information profile requires a primary authentication, and a low information profile does not require any authentication credential; and
validating the one or more received authentication credentials;
the usage information comprises user information associated with one or more of the transactions and transaction information comprising amount of the one or more transactions; and
the user information has been selected by one or more customers performing the one or more transactions and comprises user identification information comprising name information and contact information comprising a preferred email address or phone number;
receive location information associated with a location of the one or more points of transaction;
associate location information with transaction information associated with the same transaction, resulting in an transaction location profile;
store some or all the usage information including at least one transaction location profile; and
provide access to the stored usage information including the at least one transaction location profile.

9. The computer program product of claim 8, wherein the computer-executable instructions further cause the processing device to:
receive one or more e-receipts from the one or more points of transaction.

10. The computer program product of claim 9, wherein the computer-executable instructions further cause the processing device to:
store the one or more e-receipts in the memory; and
associate each e-receipt with usage information corresponding to the same transaction.

11. The computer program product of claim 8, wherein providing access to the stored usage information comprises:
receiving a request from an online banking application or a mobile banking application of a user for usage information; and
initiating presentation of some or all the usage information in response to the request.

12. The computer program product of claim 11, wherein the computer-executable instructions further cause the processing device to:
initiate communication of a message indicating to the user an opportunity to share additional user information to a specific merchant.

13. The computer program product of claim 11, wherein the computer-executable instructions further cause the processing device to:
initiate communication of a message indicating to the user information about a specific merchant or an offer from the specific merchant.

14. The computer program product of claim 8, wherein a merchant has a pre-established relationship with an administrator of the system; and
wherein providing access to the stored usage information comprises:
receiving a request from a merchant application for usage information corresponding to the merchant; and
initiating presentation of some or all the usage information in response to the request.

15. A computer-implemented method for providing information from use of readable indicia, the method comprising:
using a computer processor operating computer program code instructions stored in a non-transitory computer readable medium, wherein the computer program code instructions cause the computer processor to:
receive usage information corresponding to a plurality of readable indicia read at one or more points of transaction during one or more transactions, wherein:
reading the readable indicia further comprises:
determining whether a user profile associated with the readable indicia is at least one of a low information profile, a medium information profile, or a high information profile;
receiving one or more authentication credentials from the user based on at least the determined user profile, wherein a high information profile requires a primary authentication and a secondary authentication, wherein a medium information profile requires a primary authentication, and a low information profile does not require any authentication credential; and
validating the one or more received authentication credentials;
the usage information comprises user information associated with one or more of the transactions and transaction information comprising amount of the one or more transactions; and
the user information has been selected by one or more customers performing the one or more transactions and comprises user identification information comprising name information and contact information comprising a preferred email address or phone number;
receive location information associated with a location of the one or more points of transaction;
associate location information with transaction information associated with the same transaction, resulting in an transaction location profile;
store some or all the usage information including at least one transaction location profile; and
provide access to the stored usage information including the at least one transaction location profile.

16. The method of claim 15, wherein the computer program code instructions further cause the computer processor to:
receive one or more e-receipts from the one or more points of transaction.

17. The method of claim 16, wherein the computer program code instructions further cause the computer processor to:
store the one or more e-receipts in the memory; and
associate each e-receipt with usage information corresponding to the same transaction.

18. The method of claim 15, wherein the computer program code instructions further cause the computer processor to:
receive a request from an online banking application or a mobile banking application of a user for usage information; and
initiate presentation of some or all the usage information in response to the request.

19. The method of claim 18, wherein the computer program code instructions further cause the computer processor to:
initiate communication of a message indicating to the user an opportunity to share additional user information to a specific merchant.

20. The method of claim 18, wherein the computer program code instructions further cause the computer processor to:
initiate communication of a message indicating to the user information about a specific merchant or an offer from the specific merchant.

21. The method of claim 15, wherein a merchant has a pre-established relationship with an administrator of the system; and
wherein providing access to the stored usage information comprises:
receiving a request from a merchant application for usage information corresponding to the merchant; and
initiating presentation of some or all the usage information in response to the request.

* * * * *